United States Patent
Lillibridge et al.

(10) Patent No.: US 6,195,698 B1
(45) Date of Patent: Feb. 27, 2001

(54) METHOD FOR SELECTIVELY RESTRICTING ACCESS TO COMPUTER SYSTEMS

(75) Inventors: Mark D. Lillibridge, Mountain View; Martin Abadi, Palo Alto; Krishna Bharat, Santa Clara; Andrei Z. Broder, Menlo Park, all of CA (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/059,193

(22) Filed: Apr. 13, 1998

(51) Int. Cl.⁷ .................................................. G06F 15/173
(52) U.S. Cl. ........................ 709/225; 709/228; 709/203; 713/155
(58) Field of Search .................................. 709/203, 225, 709/228; 713/155, 169, 183, 201, 202; 380/21, 25

(56) References Cited

U.S. PATENT DOCUMENTS

| | | | |
|---|---|---|---|
| 5,425,102 | * 6/1995 | Moy | 713/183 |
| 5,434,918 | * 7/1995 | Kung et al. | 713/155 |
| 5,604,803 | * 2/1997 | Aziz | 713/155 |
| 5,721,779 | * 2/1998 | Funk | 713/155 |
| 5,784,464 | * 7/1998 | Akiyama et al. | 713/201 |
| 5,889,860 | * 3/1999 | Eller et al. | 713/202 |
| 5,953,419 | * 9/1999 | Lohstroh et al. | 380/21 |
| 5,966,445 | * 10/1999 | Park et al. | 380/25 |

\* cited by examiner

*Primary Examiner*—Zarni Maung
*Assistant Examiner*—Philip B. Tran
(74) *Attorney, Agent, or Firm*—Pennie & Edmonds LLP

(57) ABSTRACT

A computerized method selectively accepts access requests from a client computer connected to a server computer by a network. The server computer receives an access request from the client computer. In response, the server computer generates a predetermined number of random characters. The random characters are used to form a string in the server computer. The string is randomly modified either visually or audibly to form a riddle. The original string becomes the correct answer to the riddle. The server computer renders the riddle on an output device of the client computer. In response, the client computer sends an answer to the server. Hopefully, the answer is a user's guess for the correct answer. The server determines if the guess is the correct answer, and if so, the access request is accepted. If the correct answer is not received within a predetermined amount of time, the connection between the client and server computer is terminated by the server on the assumption that an automated agent is operating in the client on behalf of the user.

75 Claims, 9 Drawing Sheets

METHOD FOR SELECTIVELY RESTRICTING ACCESS TO COMPUTER SYSTEMS

FIELD OF THE INVENTION

This invention relates generally to accessing computer systems using a communication network, and more particularly to accepting service requests of a server computer on a selective basis.

BACKGROUND OF THE INVENTION

The Internet is a highly-distributed computer network that connects computers all over the world. One way to classify the computers of the Internet is as client computers and server computers. Operators of the server computers provide "Internet" services and products to users of the client computers. The different types of client and server computers are too numerous to detail here.

Providers of Internet services may want to restrict access to their servers only to human users. That is, the providers would like to deny accesses made by automated "agents" operating on behalf of users. An agent is some software program, or script generator that can mimic user accesses. It is well known on the Internet that many agents are intentionally designed to behave in a malicious, destructive, or otherwise annoying "anti-social" manner. Therefore, service providers would like to deny access by agents.

One reason for doing this is fairness. Automated agents can generate service requests at a rate thousands of times greater than a normal user. Therefore, it is quite possible that one agent can monopolize a particular service at the expense of the unassisted users. Fairness is particularly important if the provider is running a lottery, or conducting a popularity contest or a poll that allows a user to make multiple entries. As a real example, computer-generated entries in most sweepstake contests are now banned because of an incident where an agent on behalf of a contestant generated enough entries to claim a substantial portion of the available prizes.

Another reason is advertising revenue. On the Internet, advertising revenue is usually based on the number of times that advertisements are displayed when service requests are made. Unlike displaying the advertisement to a user, displaying the advertisement to an automated agent has no value. Consequently, useful advertising impact is better estimated when accesses by automated agents are denied.

Yet another reason is "spamming." On the Internet, spam is the term used to describe useless electronic messages (e-mail). There, a spamming agent, usually at a very low cost, sends a message to a large number of users. Typically, the "spam" is of narrow interest. The hope of the spammer is to make a profit even if only a small fraction of the recipients respond. On the Internet, spamming agents are generally considered counter-productive because processing spam wastes network resources and people's time. Therefore, suppressing spam generated by agents can save substantial resources.

A variant of spam arises in the context of Web search engines, such as Digital Equipment Corporation's AltaVista search engine. Search engines maintain full word indexes of Web pages. Users submit queries to locate Web pages of interest. In the case where many Web pages satisfy the query, the result set of Web pages is rank ordered according to some weighted frequency metric.

Search engines are subject to abuse, in particular by electronic agents. For instance, an electronic agent may request the search engine to index many useless or deceptive Web pages to boost the visibility of a particular topic. For example, the agent could use AltaVista's "Add-URL" facility to add pages to its index. Although "page-boosting" cannot be entirely eliminated because users can always submit individual pages one at the time, denying access to agents will reduce this abuse to a manageable trickle.

Agents should also be denied access to proprietary information. For example, a server might maintain an on-line encyclopedia, or an online collection of web pages such as the Yahoo service. Providers of such services would like to eliminate improper access to their proprietary information because an agent could otherwise easily obtain a large percentage of a database and establish a competing service.

In all of these cases, it is difficult for the server computers to differentiate requests submitted by users from those generated by an agent, otherwise agents would not be a problem.

On public telephone systems, a similar, although smaller problem exists. There, telemarketing services have used automated dialers, and tape-recorded messages to mass market products and services to consumers. In this highly regulated setting, laws have been passed banning machine-generated telemarketing calls. While this approach has worked well for telephone networks, it is unlikely to work as well in the context of the Internet and the Web because they have a number of characteristics that make it hard to effectively apply legal sanctions.

First, it is very difficult to trace a service request back to its true source, physically as well as electronically. On the Web, it is very easy to start-up a Web site, and then to abandon it after it has been exploited. On the Web, it is not fly-by-night, but fly-by-seconds. In addition, enforcement of the laws would be extremely difficult, and perhaps not worthwhile. On the basis of an individual user or provider, damages can only measured in terms of the time it takes to dispose of unwanted spam e-mail, or the loss of small incremental amounts of advertising revenue, e.g., cents, or fractions thereof. Second, the Web and the Internet operate on a global basis. Legally barring automated agents would require the cooperation of all countries, an unlikely to occur event.

In the prior art, some attempts have been made at recognizing and eliminating spam. However, almost all of the prior art methods work only for specific contexts of a particular service, and are not generally applicable to any type of Web server. We are aware of one prior art method that is applicable to any type of Web server.

Digital Equipment Corporation offered a Web service that collected and displayed polling data during the primary elections of October 1996. In the design of this service, there was a concern that the same person could enter an opinion into the poll many times, particularly in cases where many requests came from the same network address. As a precaution, the service displayed an American flag in a random position on the screen, and then required the user to click on the flag before entering an opinion. Thus, a person could not quickly enter an opinion many times. However, it is easy to write a program that recognizes the American flag and simulates a click; therefore, this method does not effectively restrict access by electronic agents.

Therefore, there is a need for a server computer to be able to distinguish an ordinary user from an automated agent so that access by the agent can be denied, and while still permitting access to real human users.

SUMMARY OF THE INVENTION

Provided is a method and apparatus for selectively accepting access requests from a client computer connected to a server computer by a network, for example, the Internet and the World Wide Web. The connection between the client and server can use the Internet Protocol, and the interactions between the client and server can be conducted using Web pages.

The server computer receives an access request from the client computer via the network. In response, the server computer generates a predetermined number of human-perceptible random characters, for example, letters and numbers. The random characters are used to form a string in the server computer.

The string is randomly modified either visually or audibly to form a riddle. For example, the character can be visually distorted and overlaid on a random visually "noisy" background such as a maze. Alternatively, the string is processed by a speech synthesizer with an appropriate level of distortion or noise added. In any case, the original string, i.e., the correct answer to the riddle, is still easy to recover by the user. While automated computation of the answer will take a substantial amount of time, if it can be done all.

The server computer renders the riddle on an output device of the client computer, for example a display terminal or a loudspeaker. In response, the client computer sends an answer to the server. Hopefully, the answer is a user's guess for the correct answer. The server determines if the guess is the correct answer, by comparing the answer with the unmodified string.

If the answer is correct, then the access request is accepted. If the correct answer is not received within a predetermined amount of time, the connection between the client and server computer is terminated by the server on the assumption an automated agent is operating in the client computer on behalf of the user.

DETAILED DESCRIPTION OF THE PREFERRED EMBODIMENTS

Figure 1:
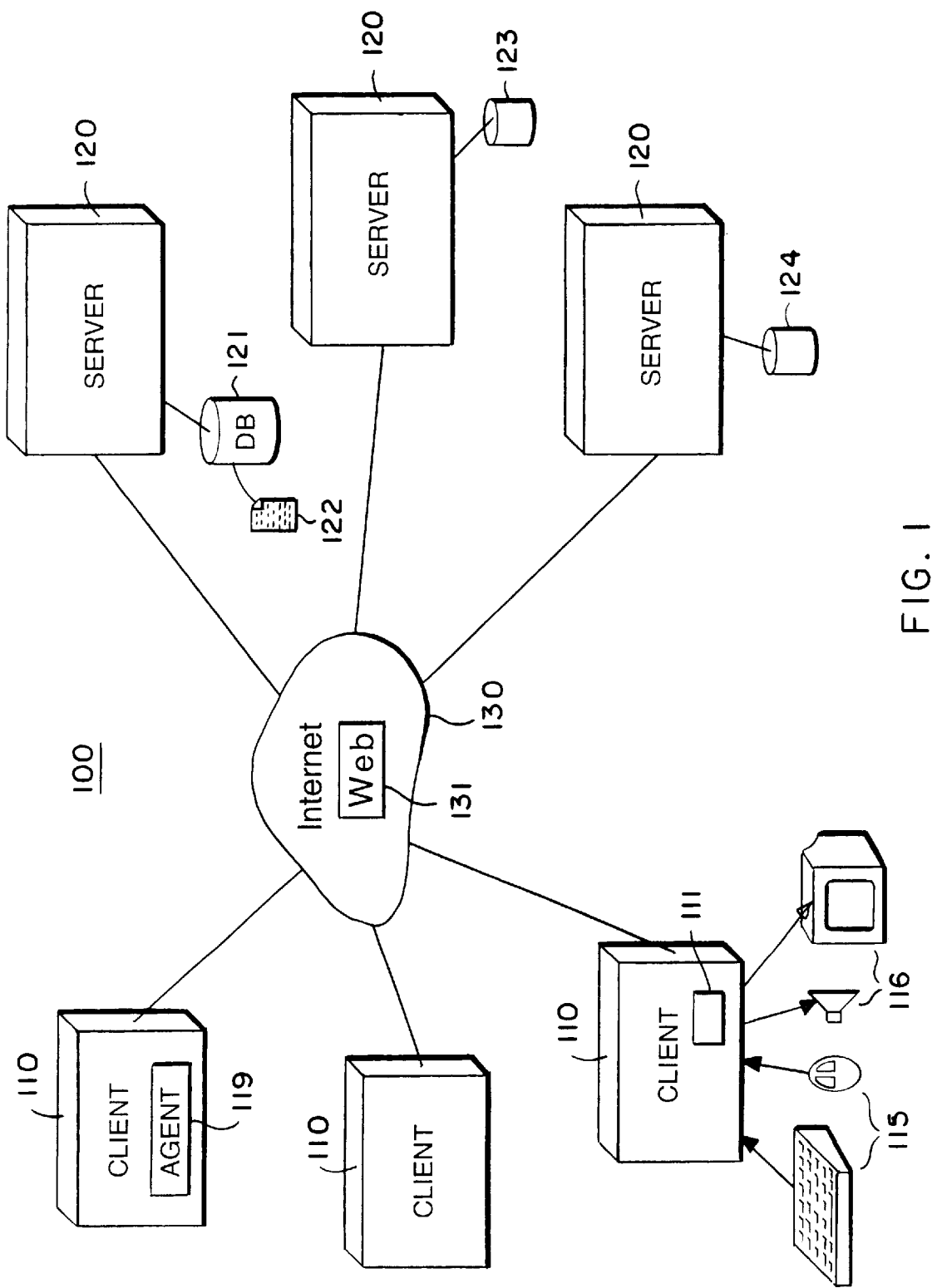
FIG. 1 is a block diagram of a network of client and server computers that use the invention.

As shown in FIG. 1, a widely distributed network of computers 100 includes numerous client computers 110 connected to server computers 120 by a network 130, e.g., the Internet. Generally, the servers 120 provide "Internet" services and products to users of the clients 110. The Internet includes an application interface called the World Wide Web (the "Web") 131. The computers communicate with each other using messages that include the addresses of the sending and receiving computers; these addresses are called Internet Protocol (IP) addresses.

The client computers 110 can be personal computers, workstations, or laptops. Typically, the clients 110 are equipped with input devices 115, such as a keyboard and a mouse, and output devices 116 such as a loudspeaker and a display terminal. Software in the form of a Web browser 111, for example, the Netscape Navigator, or the Microsoft Internet Explorer, interacts with the I/O devices 115–116 to provide an interface between the client user and the Web 131.

The server computers 120 are usually larger computer systems, although this does not always need to be so. Some of the servers, e.g., Web "sites," maintain a database (DB) 121 of Web pages 122. Each Web page 122 is identified and can be located by its name, e.g., a Uniform Resource Locator (URL). The pages 122 can include "links" to other pages. A user can "click" on a link of a page viewed with the browser 111 to retrieve a linked page.

Other servers maintain an index 123 of the content of Web pages. These servers are called search engines. Search engines accept search requests in the form of queries posed by users to locate Web pages having content on a specified topic. Some of the servers may provide other products and services 124 that can be reached by using the browser 111.

As described above, it is fairly easy for a client user to design an automated process, or script generator (agent) 119 that can perform a large number of Web interactions in a short time with minimal effort. For example, the agent 119 can automatically generate Web pages to be placed in the index 123. Similarly, the agent 119 could easily make copies of the information 124 or obtain other services. The invention denies Web access by agents, and only allows access by users themselves.

Figure 2:
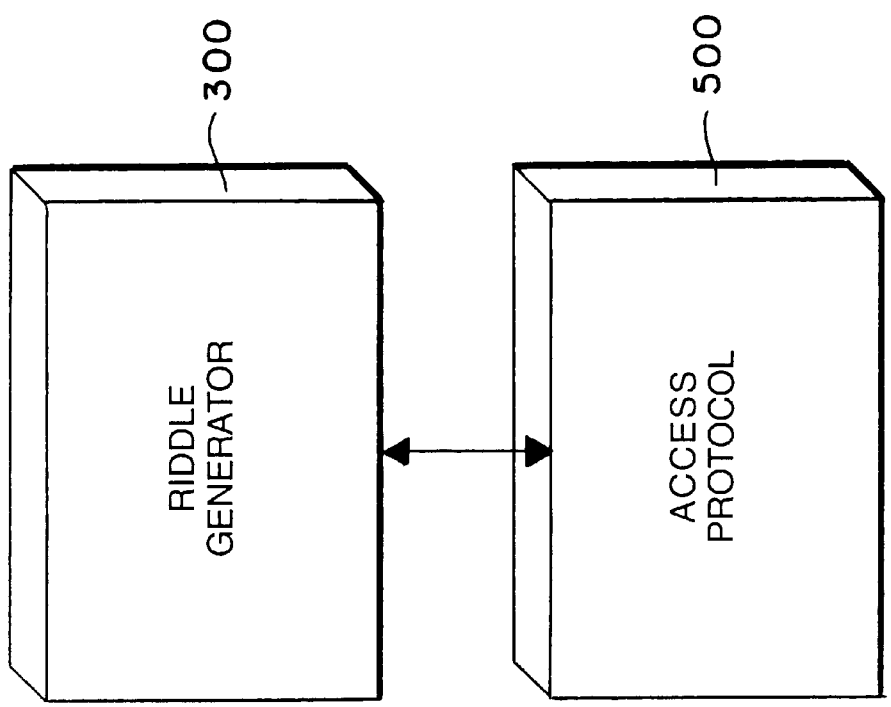
FIG. 2 is a block diagram of a riddle generator cooperating with an access protocol according to the invention.

As an introduction, and as shown in FIG. 2, our invention can be broken into two parts. A procedure 300 randomly generates "riddles" with corresponding answers that are easy for human users to answer. However, the riddles are very difficult to solve by the automated agent 119. An access protocol 500 that interacts with the riddle generator ensures that a server only responds to requests from clients that are capable of solving the generated riddles.

Together, the procedure 300 and the protocol 500 act to bar requests made of the server by automated agents. We describe particular implementations for each of these parts; others are possible, but the embodiments we described herein are preferred.

Generating Riddles

Figure 3:
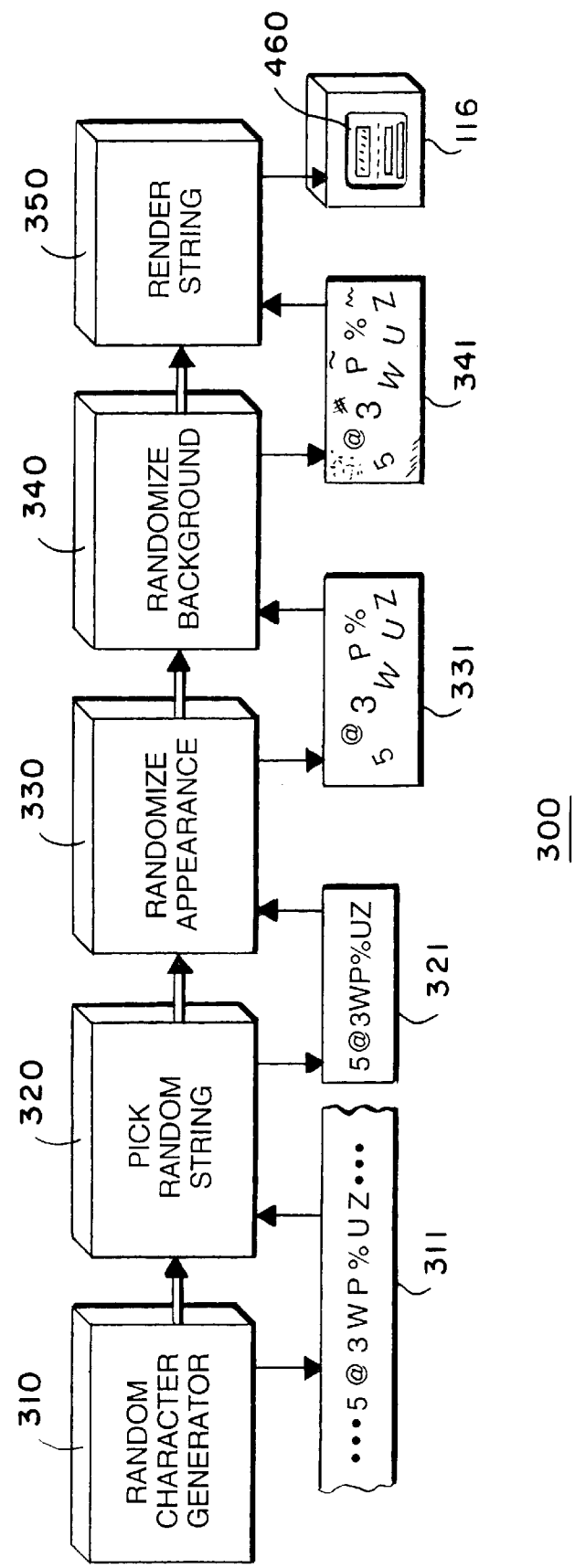
FIG. 3 is a flow diagram of a process that generates visual riddles.

FIG. 3 shows the details of the procedure 300 for generating riddles. First in step 310, we generate human perceptible random characters 311. Any of the generated characters 311 can be rendered on the output devices 116 so that they can be viewed by a user. In step 320, we select a small number of the random characters to form a string 321.

The number of characters used to form the string 321 needs to be long enough to prevent the agent 119 from solving the riddles simply by using brute-force guessing techniques, yet not so long as to unnecessarily annoy the user. Thus, the number of characters used depends on the processing power of available computers and how much time is available to solve the riddle. At this time, a string of eight characters long combined with a time limit of five minutes seems sufficient.

In step 330, we next randomize the "appearance" of the string 321 to obtain a "morphed" string 331. This can be done using several techniques. For example, each character can be rendered in a different randomly selected font. The spacing between characters can be varied depending on the size of the character, and distance from a baseline to the character. Some of the characters can be rendered close enough together so that they partially intersect.

Each character, as well as the entire string, can randomly be stretched or distorted in any number of ways. The string can follow a random path, e.g., rather than following a straight path, the characters of the string can follow a curved path like the letter W, although care must be taken here to ensure that the string does not loop back on itself. The string can randomly be rotated around a randomly selected point; e.g., the string might be mirror-reversed.

In step 340, a confusing random background 341 is chosen on which the string is overlaid; a random maze may be one good choice. The characters of the string can be rendered in various randomly chosen colors that are visually distinct from the background pattern, for instance the character coloring can use a different maze-type pattern.

Various randomly chosen combinations of these rendering techniques can be used to make it difficult to discover the string using standard optical character recognition (OCR) techniques or segmentation techniques. A bibliography of document image understanding references, including work on OCR, is available at "http://documents.cfar.umd.edu/biblio/".

Regardless of what combination of techniques are used, we exclude different characters that are perceptually similar in a string. For example, characters like "l" (lowercase l) and "1"(one) are visually similar. The same can be said for the letter "O, o", and the number "0," because it would be hard for a user to distinguish these characters. Similarly, for characters which are indistinguishable in multiple cases, e.,g. lower case "c" and upper case "C," we choose a preferred case, generating riddles only using that case for those characters. The user's guess may use either case; we convert the user's guess to use the preferred case for the hard-to-distinguish characters before comparing the user's guess to the answer.

In step 350, the randomly-processed string is rendered so that it can be seen by a user of one of the client computers 110. The rendering can be done on the display terminal 116 of the client computer 110 using the browser 111. Alternative rendering techniques are described below.

Figure 4:
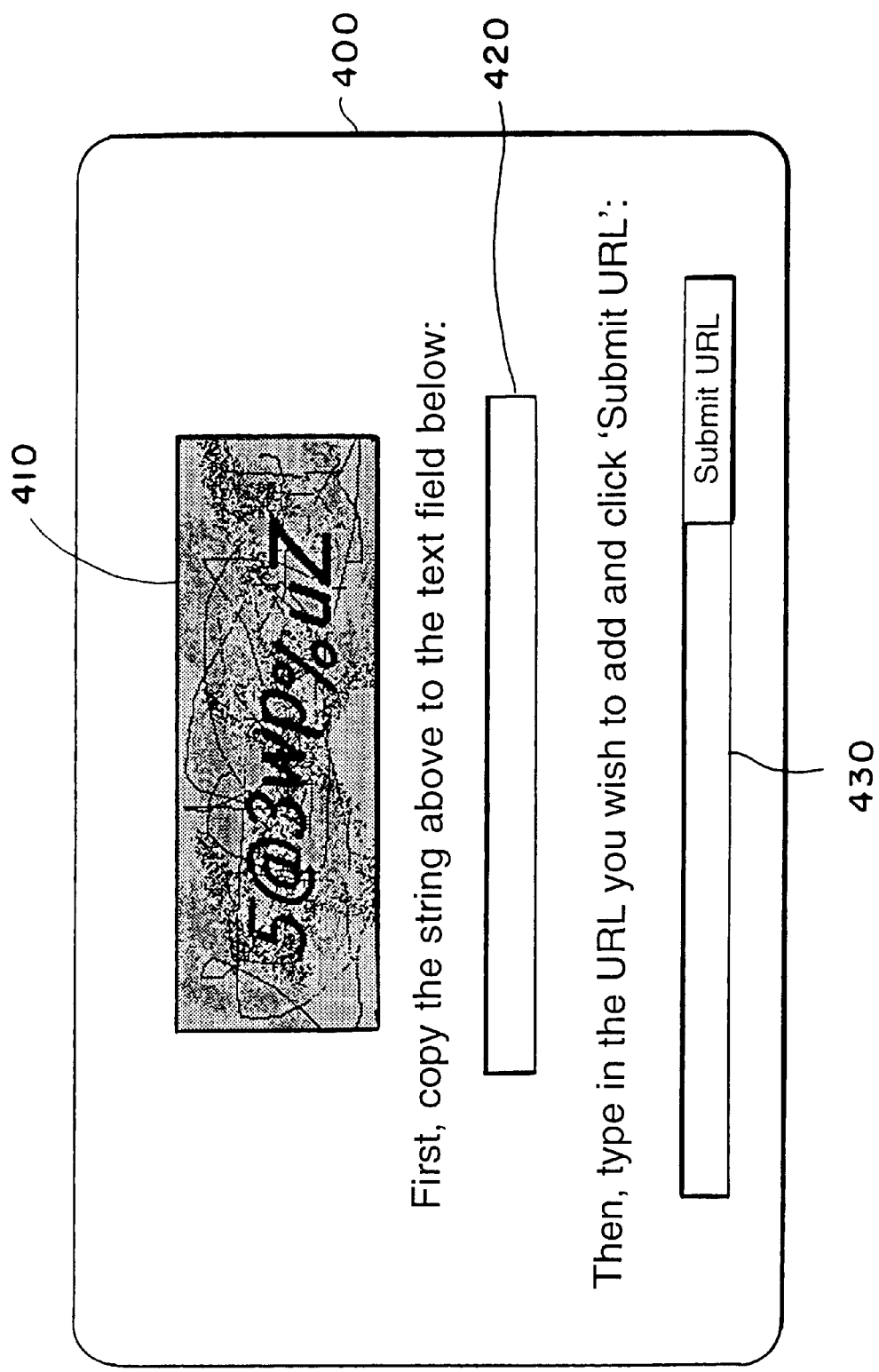
FIG. 4 is an image of a visually rendered riddle, and fields for client/server interactions.

FIG. 4 shows an example use of the randomly-generated string. In this example, a portion of a Web page 400 is shown. The Web page 400 is constructed using Hyper-Text Mark-up Language (HTML) so all rendering and protocol interactions can be managed from the server. The server in this example is a search engine, e.g., AltaVista. The AltaVista search engine has a feature called Add-URL that allows Web-site owners to register their site(s) with the search engine's index 123, see "http://www.altavista.digital.com/av/content/addurl.htm". The user submits a URL, and the search engine indexes all Web pages at this site.

The Add-URL feature is subject to abuse by people who wish to unfairly increase the chances of AltaVista serving up their pages in response to a query. They do this by using electronic agents to submit a large number of URLs for each site. Our method can be used to prevent this.

According to our invention, the page 400 fundamentally includes three fields 410, 420, and 430; some of these fields, called forms, allow user interaction—that is, the fields accept typed input from the user. The riddle is displayed in field 410. As is apparent, the human eye can easily discern a sequence of letters "5@3wp %1u" among the background clutter.

The user easily guesses the correct answer. It is our intent to make it more difficult for the agent 119 of a client computer to come up with the correct answer. In other words, it is unlikely that an agent of the client can act as an imposter for the user.

The guess is typed in the field 420. Checking of the guess is done in a case-insensitive manner. If the guess is correct, and a predetermined time constraint is met, then the server accepts input from field 430, a URL, to add the user's Web page to the search engines index. Of course, using our invention, the search engine can also index any other Web pages at the same site, or perform other services, for example, a request to delete a Web page.

Riddles rendered in this form are good at separating humans from electronic agents: while humans easily recognizing numbers and letters or other patterns in almost any form, computerized processes can consume enormous amount of resources and time, and yet, perform poorly at this task for all but the simplest problems.

Access Protocols

In this section, we describe a basic communication protocol for using the riddles, plus some alternative embodiments. As an initial state, the server 120 possesses a master secret, denoted "MS," known to it alone. The server also can perform a cryptographic hash function H that combines terms (D1, D2, . . . , Dn). The cryptographic hash function can be a function such as MD5 or SHS. Hash functions "scramble" bits, and as a result tampering with hashed values is easily to detect.

Cryptographic hash functions have the useful property that they are hard to invert. For example, given H(D1, D2), and D2, there is no efficient way to determine D1. Cryptographic hash functions are also collision-resistant in the sense that it is hard to find two inputs that yield the same output. See "Applied Cryptography" by Schneier for details on known cryptographic hash functions.

Basic Protocol

Figure 5:
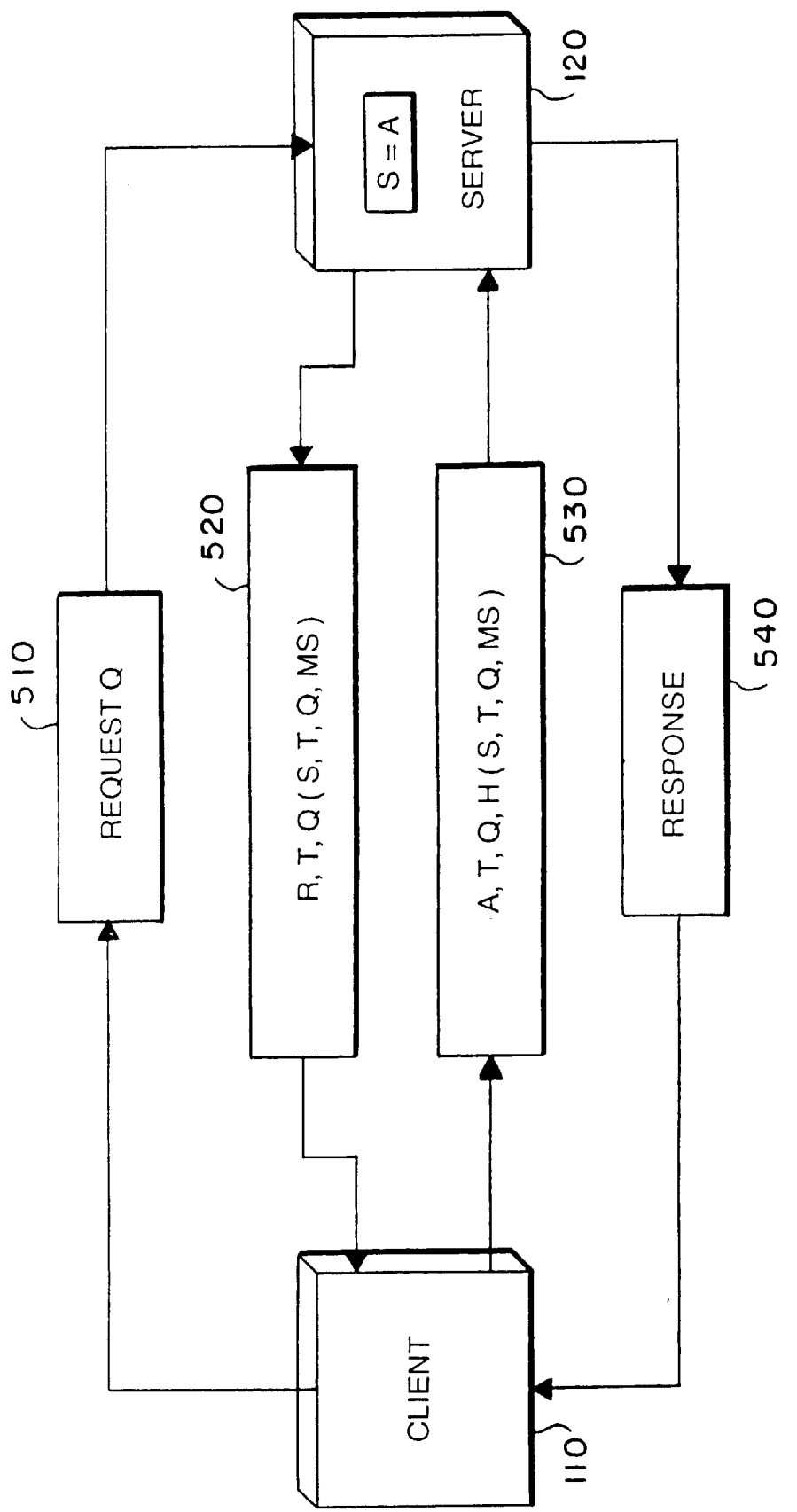
FIG. 5 is a flow diagram of the preferred access protocol.

As shown in FIG. 5, the basic protocol between the client 110 and the server 120 proceeds as follows. The client 110 sends a request Q 510 to the server 120. For example, the request Q 510 might be "Add my URL to your index."

The server, upon receipt of the request, replies to the client 110 with information R, T, Q, H(S, T, Q, MS) 520, where R is the randomly-generated riddle from the string of random characters as described above. The value T is the current server time, Q is the original request 510, and S is the string that is used to form the riddle—that is the correct answer to the riddle. Notice, the hashing of the combination of the correct answer S, the values T, and the request Q, with the secret MS. This information can only be used by one who has possession of the master secret, i.e., the server computer.

In turn, the client replies to the server with A, T, Q, H(S, T, Q, MS) 530, where A is the user's guessed answer to the riddle, as typed with any hard-to-distinguish characters, case adjusted, in field 420 above. The other values are copied directly from the server's reply 520. The other values can be copied using HTML as stated above, so all the user needs to do is to type the guess; the server controls the rest of the interaction.

Upon receipt of the message containing the guess, the server computes H(A, T, Q, MS) and compares this value with H(S, T, Q, MS) to determine if the guess is the correct answer, i.e., the string S. If the riddle is not answered in the required time, then the server can terminate the connection under the assumption the request was generated by an agent of the client, and not the user. Otherwise, if the riddle is solved in less than the required time, for example less than five minutes, the server can allow the request Q and provide a response 540.

Our basic protocol has the advantage of being totally confined to a static state, initially knowing the master secret and a cryptographic hash function to apply to any sequence of bits. Other than that, the server 120 does not have to remember anything beyond the current message being processed according to our protocol, no matter how many requests are outstanding from other users. This saves memory resources, and simplifies our protocol implementation.

As a consequence of the static state under which our basic protocol operates, it cannot prevent a client from replaying the same request Q 510 many times while solving one riddle. The same request and answer pair can be used until the time allotted for solving the riddle has run out.

This is not a substantial drawback for services like a search engine where repeating the same request multiple times can be made equivalent to just doing it once; e.g., adding a page to the index is an idempotent operation. Similarly, if the server maintains an on-line dictionary, an agent posing as a user will derive no benefit from looking up the same word many times. Hence our basic protocol is also adequate for those services.

On the other hand, the scenario above is a problem in Web applications like computerized polling or automated contests. The following variation on our basic protocol remedies this drawback at the cost of requiring the saving of additional state information.

Figure 6:
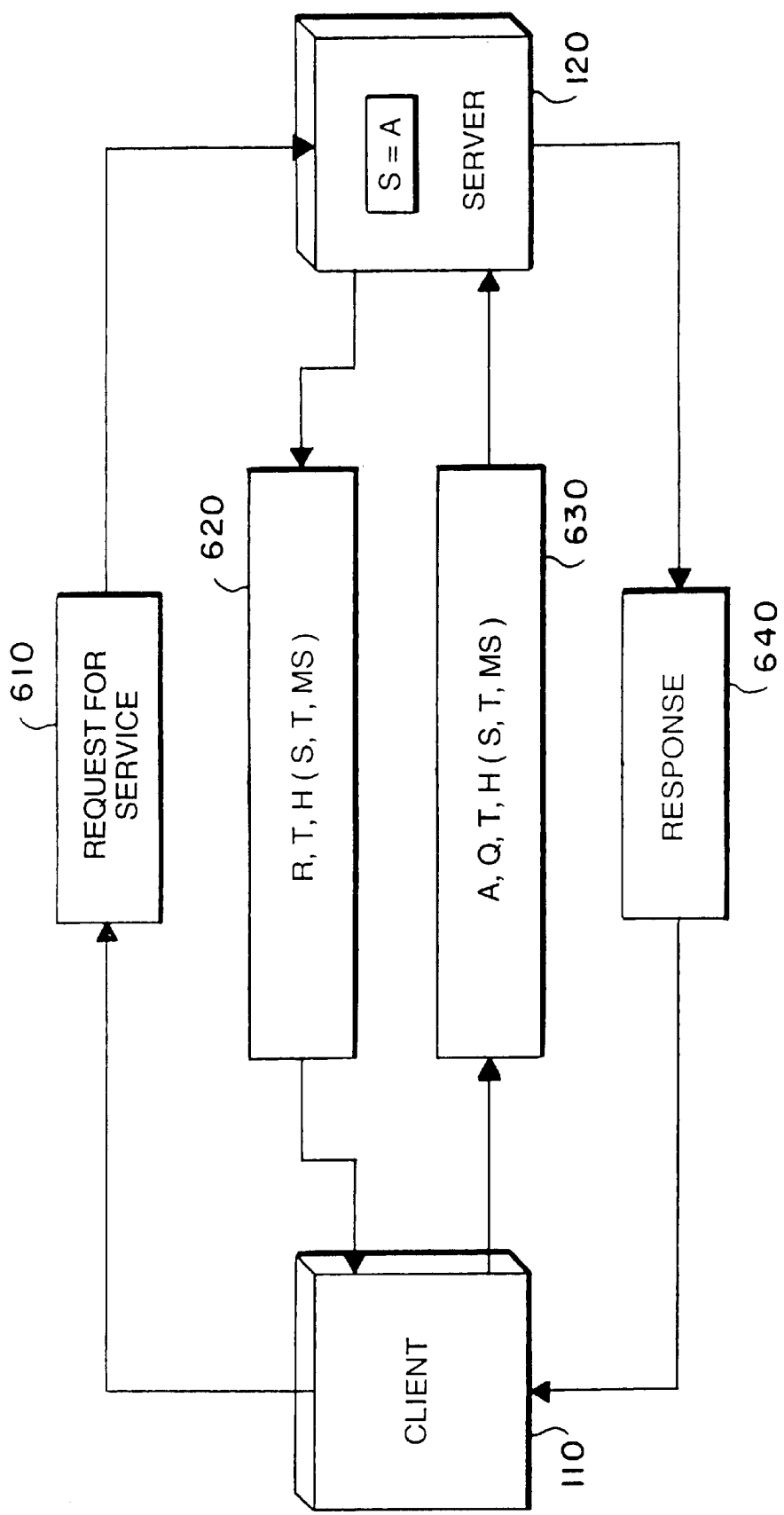
FIGS. 6–8 are flow diagrams of alternative access protocols.

As shown in FIG. 6, the client sends a generic request for service message Q 610 to the server. The particular request, Q, is sent later with the guess in this variation of the protocol. The server replies in message 620 with R, a random riddle generated as described above, the current server time T, and H(S, T, MS), where S is the correct answer to R.

The client replies with A (the user's answer), Q (the particular request the user wishes granted, T, and H(S, T, MS), all but S copied directly from the server's reply 620. The server computes H(A, T, MS) and compares this value with H(S, T, MS). If these values are identical, and the difference between T and the current server time is less than the maximum time allowed to solve the riddle, and the server has not recently honored a request with the same associated hash value H(S,T, MS), then the server carries out the request Q and provides a response 640.

With this variant, the server must store a list of the H(S, T, MS) values it has recently sent out. After the time in the saved hash value is older than the maximum time allowed to solve the riddle, the hashed value can be discarded as it is no longer needed to prevent replays.

Alternately, the server can detect replays by keeping a list of T's it has recently sent out in 620. If a given T is the same as that of a request recently serviced, then the new request is refused. This alternative relies on the fact that the server's clock increments time at a fast enough rate so that no user-generated requests can be received in the same clock tick; in other words the value T also uniquely identifies service requests. Like above, the server only needs to keep recent T values. In fact, it suffices to keep just the lower-order bits of the T values; that is, only those bits that change during the riddle-solving time period. This reduces the amount of memory needed to store the states associated with various user requests.

Figure 7:
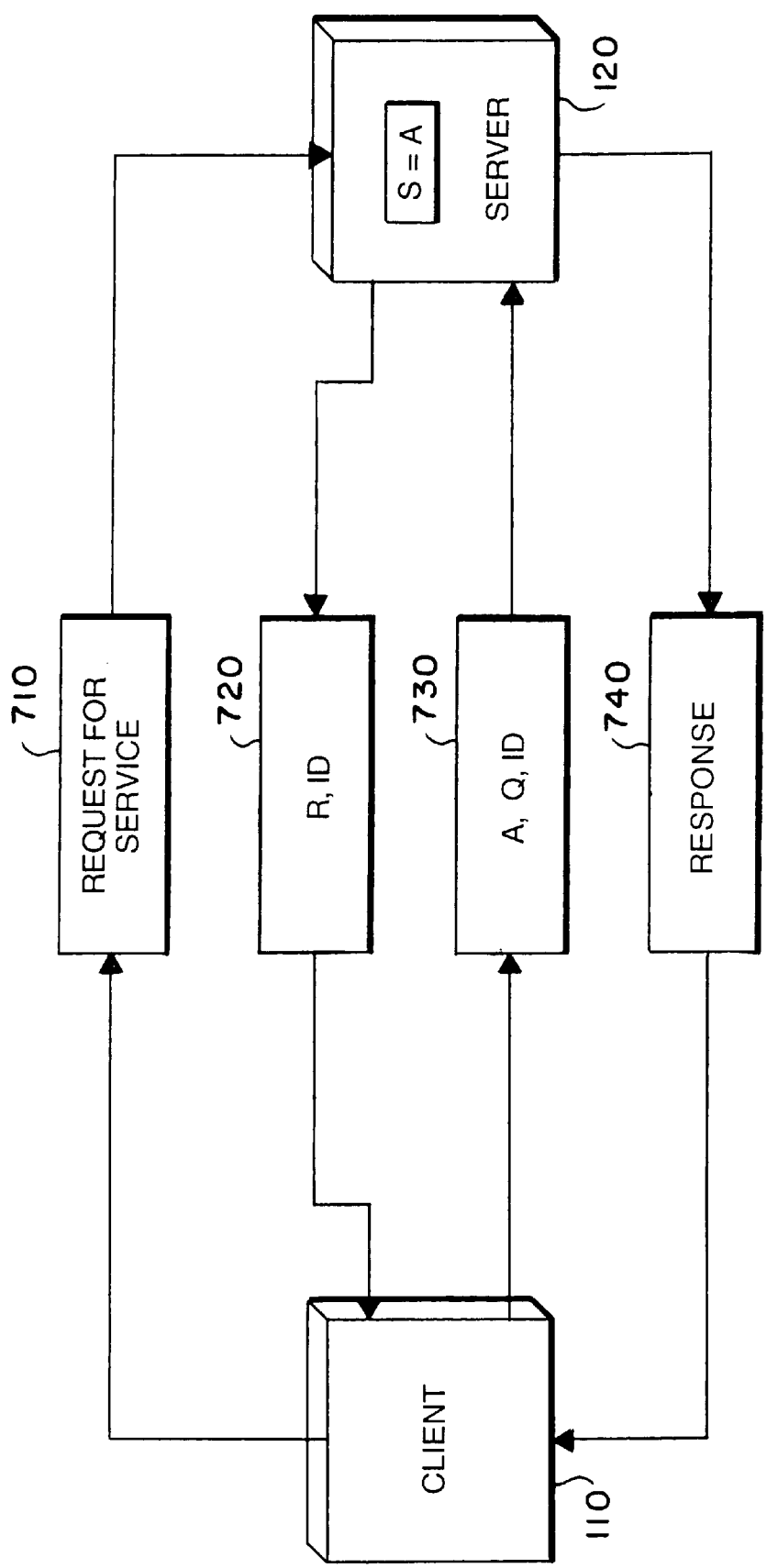

If, on the other hand, space is not an issue, it may be desirable to replace the value generated by the cryptographic hash functions with transaction identifiers as shown in FIG. 7. The client sends a generic request Q for service 710. The server replies with R, ID 720, where R is our random riddle, Q is the user's actual request, and ID is a unique transaction identifier. The server stores the values ID, S, and T together; in other words, the answer and the current time are associated with the ID.

The client replies A, Q, and ID 730, where A is the user's guess for the correct answer to the riddle, and ID is copied from 720. The server then compares the correct answer S of the associated ID with the guessed answer A. If these values are identical, and the time T is close enough to the current time, and the server has not recently honored a request with transaction identifier ID, then a response 740 is provided. The values ID, S, and T can be removed after the predetermined interval has expired, or when multiple requests are received in a very short time interval, i.e., a rate which could not generated by a user, but could be indicative of an automated agent. This variation uses more state, but may be faster because there is no need to compute cryptographic hash functions.

Extra space can also be used to increase security by maintaining a count with each ID of how many times its associated riddle has been guessed at. If too many wrong answers are submitted for a given riddle before the correct answer is given, then service may be refused. This is equivalent to adding a maximum number of guesses per riddle limit in addition to the existing maximum time limit.

In an alternative embodiment, we include identifications of the client and the server. These identifications can be based on IP addresses, or on more elaborate cryptographic credentials. Here we consider the use of IP addresses, as these are most immediately applicable in the current context of the Web. We describe how to add the client's IP address to our basic protocol. The treatment of the other protocols is analogous.

Client Addresses

Figure 8:
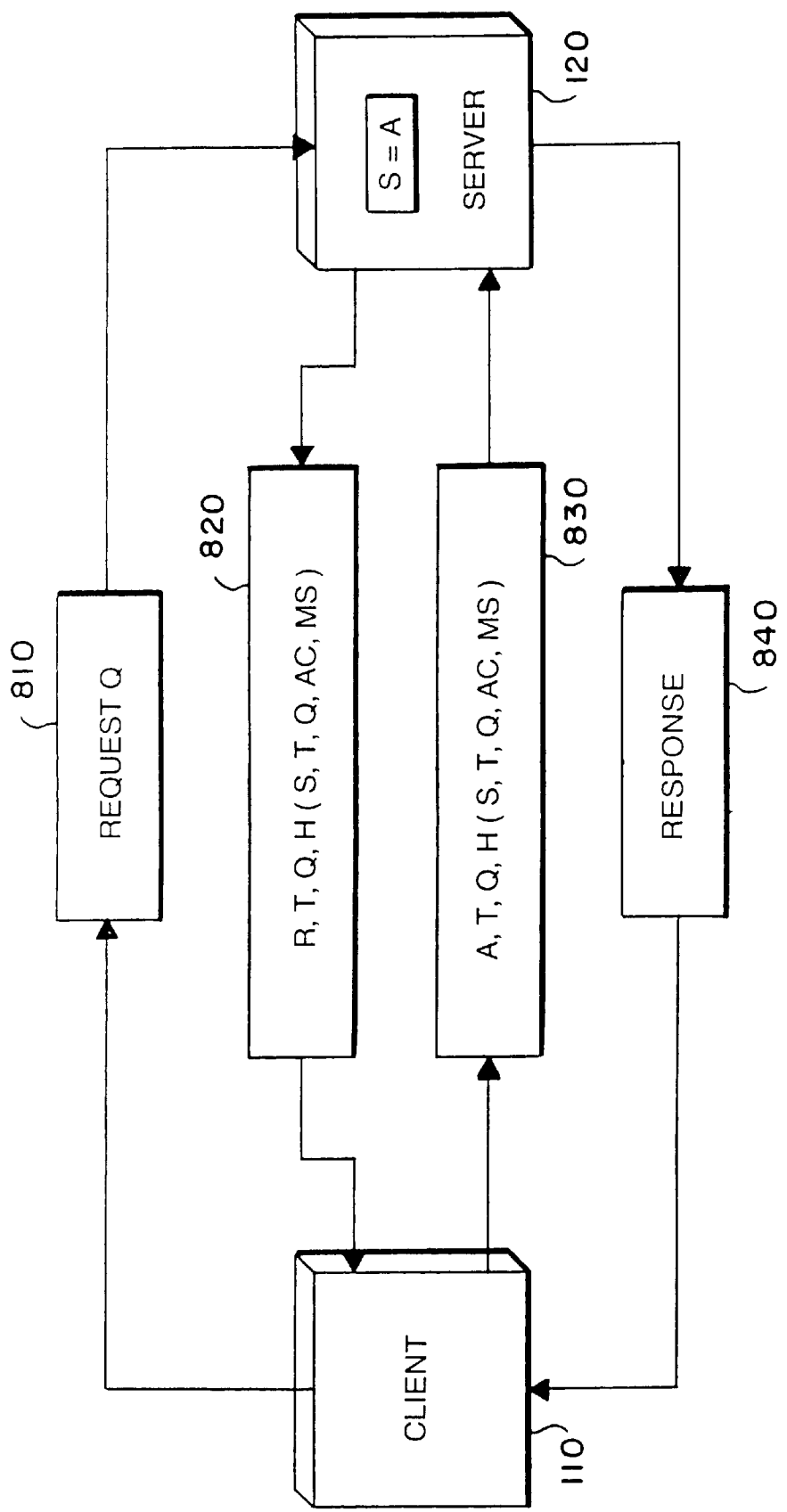

As shown in FIG. 8, the client 110 sends a request Q 810 to the server 120. The server replies R, T, Q, H(S, T, Q, AC, MS) 820, where AC is the IP address of the client. In turn, the client replies to the server with A, T, Q, H(S, T, Q, AC, MS) 830, where all values but A are copied from 820. The server computes H(A, T, Q, AC, MS) and compares this value with H(S, T, Q, AC, MS) to determine if the guess is correct in which case the request 810 is honored. By including the IP address AC, it can be determined when messages 810 and 830 came from the same source.

Relaxed Checking

The above described protocol variants require the user to solve one riddle for each request. It may be desirable in some cases to relax this requirement. For example, the server may present a new riddle less frequently, for example, a new random riddle is generated for each five requests. This requires much less work of the user while still greatly limiting the abilities of automated agents. Our protocols are easily modified to support limited replay of this form.

More generally, because the majority of users are honest and do not abuse servers with agents, the server can combine any of our protocols with a standard revokable password system. A user without a valid password is required to answer one riddle per request. If it is determined after a trial period that the user is acting responsibly, then the server can issue the user with a personal password that would allow users to request services without the need to solve further riddles. The password can be sent to the client using any type of private/public key exchange, for example, Diffie-Hellman. The server can subsequently monitor the rate of requests, and if the rate is indicative of an agent, the server can revoke the user's password, forcing the user to start solving riddles again.

Our method is well suited for blocking spam e-mail because most spam messages are first messages from previously unknown users. An honest user intent on sending an e-mail message can solve our riddles without too much effort; however, an agent attempting to send thousands of messages will soon be frustrated.

We can also relax the requirement that the user answer a riddle for every request when the server tracks repetitive accesses by the same user. The IP address of the originating client can be used for this purpose, or, in the case of Web services, we could employ the HTTP "'cookie" mechanism for this purpose, see "http://www.netscape.com/newsref/std/cookie_spec.html". Briefly, a cookie is a file that a server can leave in a client's memory for subsequent examination.

Other Rendering Modalities

The riddle does not necessarily need to be presented to the user as an image on a display device. Other rendering modalities, such as text or speech, can also be used. In the text version, the riddle can be expressed as a natural language question, for example, "Please type the third letter of the word seventeen, followed by a comma and a semicolon." In this case, the string "v,;" is the correct answer. The server can randomly pose other types of natural language questions. It should be noted that presenting riddles in this manner may be easier for agents to decipher.

Figure 9:
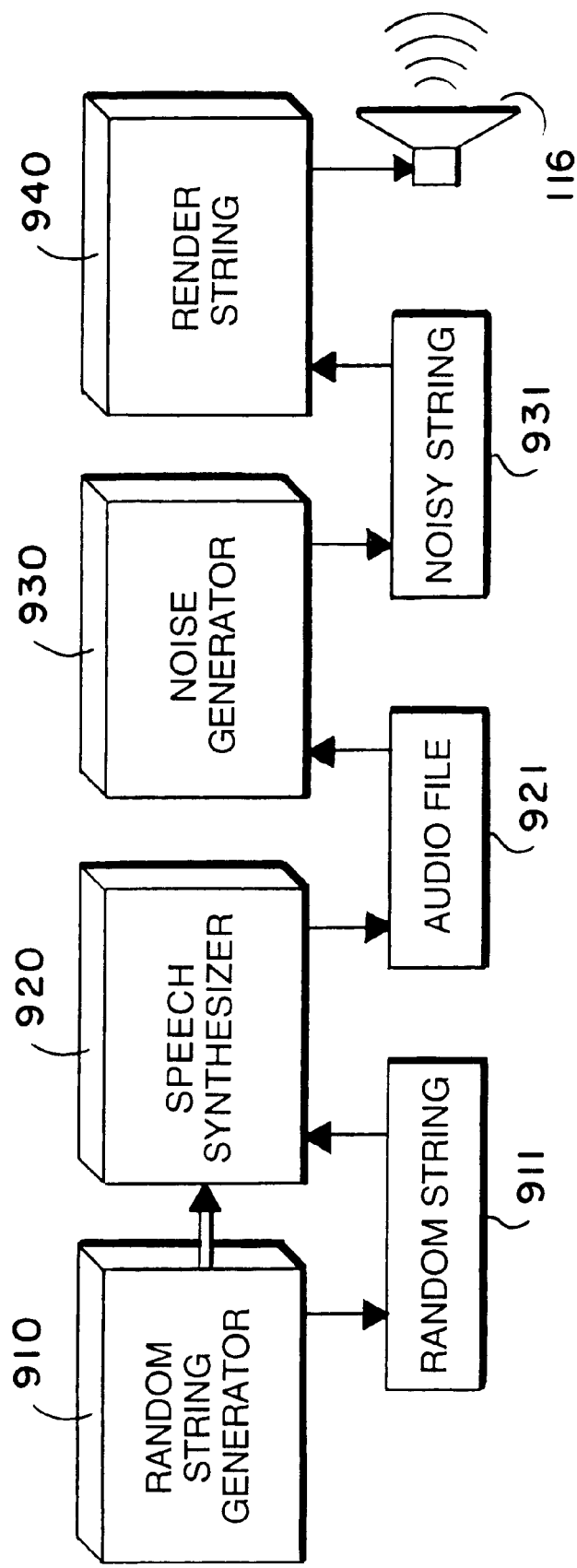
FIG. 9 is a flow diagram of a process that generates audible riddles.

In the audio version as shown in FIG. 9, the string generator 910 produces a random string 911. A speech synthesizer 920 is used to convert the string 911 to an audio file 921. The audio file is then distorted by a noise generator 930 to produce a noisy string 931. Last, the string is rendered (940) on the loudspeaker 116 of the client as audible text. Thus, the invention can be used by visually-impaired users.

Our invention poses riddles that are difficult to solve by agents, but easy to answer by humans. In addition, we provide a secure protocol to interact with the user. These features permit a server to selectively give service only to humans.

It is understood that the above-described embodiments are simply illustrative of the principles of the invention. Various other modifications and changes may be made by those skilled in the art which will embody the principles of the invention and fall within the spirit and scope thereof as set out in the claims attached.

We claim:

1. A computerized method for selectively accepting access requests from a client computer connected to a server computer by a network, comprising:

receiving an access request in the server computer from the client computer via the network;

generating a predetermined number of random characters to form a string in the server computer in response to the access request;

modifying at least one perceptual attribute of the string of random characters to form a riddle configured to be easily answered by a human being with no advance knowledge of the riddle while being substantially difficult to answer by an automated agent unaided by human being, the string being a correct answer to the riddle;

rendering the riddle on an output device of the client computer;

receiving an answer to the riddle from the client computer;

determining if the answer to the riddle is correct; and accepting the access request if the answer is correct and received within a predetermined time interval and otherwise denying the access request, wherein the access request is denied when the access request is received from the automated agent.

2. The method of claim 1 wherein at least one visual attribute of the string is randomly modified to form the riddle, and the riddle is rendered as an image on a display device of the client computer.

3. The method of claim 2 wherein the modifying includes assigning a respective multiplicity of fonts to the respective characters in the string so as to modify the at least one visual attribute of the string to form the riddle.

4. The method of claim 2 wherein the random characters of the string are rendered using randomly selected fonts.

5. The method of claim 2 wherein the random characters of the string are rendered using randomly selected sizes of the characters.

6. The method of claim 2 wherein the random characters of the string are rendered using random spacing between the random characters.

7. The method of claim 2 wherein the random characters of the string are rendered along a randomly selected path.

8. The method of claim 2 wherein the random characters of the string are randomly rotated about a randomly selected point.

9. The method of claim 2 wherein the random characters of the string are rendered using randomly selected colors.

10. The method of claim 2 wherein the random characters of the string are overlaid on a randomly selected background in the image.

11. The method of claim 10 wherein the background is a randomly generated maze.

12. The method of claim 1 wherein similarly appearing random characters are discarded before forming the string.

13. The method of claim 1 wherein the riddle is a natural language question rendered as text.

14. The method of claim 1 wherein at least one audio attribute of the string is randomly modified to form the riddle, and the riddle is rendered as an audio signal by a loudspeaker of the client computer.

15. The method of claim 1 wherein the audio signal is randomly distorted.

16. The method claim 15 wherein random noise is added to the audio signal.

17. The method of claim 1 further including:

sending a first message to the client computer in response to receiving the access request from the client computer, the first message including the random characters of the string in the modified form of the riddle, a current time supplied by the server computer, the access request, and further including a first encoded value of a combination of the string, the current time, the access request and a master secret possessed by the server computer.

18. The method of claim 17 wherein the encoded value is generated by applying a hash function on the combination of the string, the current time, the access request and the master secret.

19. The method of claim 18 further including receiving a second message from the client computer, the second message including the answer, the current time supplied by the server, the access request, and the encoded value.

20. The method of claim 19 further including comparing a second encoded value computed by applying the hash function to a combination of the answer, the current time, the access request, and the master secret with the first encoded value to determine if the answer is identical to the string.

21. The method of claim 20 further including terminating the connection between the client computer and the server computer after the predetermined time interval from the current time of the first message.

22. The method of claim 2 wherein the client computer and the server computer are connected by the Internet, and the string is rendered using a Web page.

23. The method of claim 1 further including:
sending a first message to the client computer in response to receiving the access request from the client computer, the first message including the random characters of the string in the modified riddle form, a current time supplied by the server computer, and further including a first encoded value of a combination of the string, the current time, and a master secret possessed by the server computer; and
storing the first encoded value in a memory of the client computer.

24. The method of claim 23 further including:
receiving a second message from the client computer, the second message including the answer, the current time supplied by the server, and the encoded value.

25. The method of claim 24 further including comparing a second encoded value computed by applying the hash function to a combination of the answer, the current time, and the master secret with the stored first encoded value to determine if the answer is identical to the string.

26. The method of claim 25 wherein the first encoded value is removed from the memory after a first predetermined time interval.

27. The method of claim 26 further including:
terminating the connection between the client computer and the server computer if another access request is from the client within a second predetermined time interval, the second predetermined time interval being substantially less than the first predetermined time interval.

28. The method of claim 1 further including:
sending a first message to the client computer in response to receiving the access request from the client computer, the first message including the random characters of the string in the modified riddle form, and a transaction identifier; and
storing the string and a current time of the server with an associated transaction identifier in a memory of the client computer.

29. The method of claim 28 further including:
receiving a second message from the client computer, the second message including the answer, the access request, and the transaction identifier.

30. The method of claim 29 further including comparing the answer with the stored string of the associated transaction identifier to determine if the answer is identical to the string.

31. The method of claim 30 wherein the access request and the associated transaction identifier are removed from the memory after a first predetermined time interval from the current time of the first message.

32. The method of claim 31 further including:
terminating the connection between the client computer and the server computer if another access request is from the client within a second predetermined time interval, the second predetermined time interval being substantially less than the first predetermined time interval.

33. The method of claim 1 further including:
sending a first message to the client computer in response to receiving the access request from the client computer, the first message including the random characters of the string in the modified riddle form, a current time supplied by the server computer, the access request, an address of the client computer, and further including a first encoded value of a combination of the string, the current time, the access request, the address, and a master secret possessed by the server computer.

34. The method of claim 32 wherein the encoded value is generated by applying a hash function on the combination of the string, the current time, the access request, the address and the master secret.

35. The method of claim 33 further including receiving a second message from the client computer, the second message including the answer, the current time supplied by the server, the access request, and the encoded value.

36. The method of claim 34 further including comparing a second encoded value computed by applying the hash function to a combination of the answer, the current time, the access request, the address, and the master secret with the first encoded value to determine if the answer is identical to the string.

37. The method of claim 35 wherein the access request is accepted if the second message including the correct answer is received within the predetermined time interval from the current time supplied by the server computer.

38. The method of claim 36 further including terminating the connection between the client computer and the server computer after the predetermined time interval from the current time of the first message.

39. The method of claim 1 further including:
accepting a predetermined number of access requests after the correct answer is received before rendering an additional riddle.

40. The method of claim 1 further including:
sending a password to the user if a predetermined number of access requests are accepted from the client; and
accepting additional access requests from the client if the additional access requests are received along with the password.

41. The method of claim 40 further including:
revoking the password if the rate at which the additional access requests are received is less than a predetermined threshold.

42. The method of claim 1 wherein the access request is an electronic mail message.

43. The method of claim 1 wherein the server computer is a search engine, and the access request is to add a Web page to an index of the server computer.

44. The method of claim 1 wherein the server computer stores information, and the access request is to read the information.

45. The method of claim 1 wherein the access request is a response from the client computer to a poll generated by the server computer.

46. The method of claim 1 wherein the access request is an entry for a contest operated by the server computer.

47. An apparatus for accepting access requests from a client computer connected to a server computer by a network, comprising:
means for receiving an access request in the server computer from the client computer via the network;
a random character generator generating a predetermined number of random characters to form a string in the server computer in response to the access request;

means for modifying at least one perceptual attribute of the string of random characters to form a riddle configured to be easily answer by a human being with no advance knowledge of the riddle while being substantially difficult to answer by an automated agent unaided by a human being, the string being a correct answer to the riddle;

means for rendering the riddle on an output device of the client computer, a correct answer to the riddle being the string;

means for receiving an answer to the riddle from the client computer;

means for determining if the answer to the riddle is correct; and means for accepting the access request if the answer is correct and received within a predetermined time interval and otherwise denying the access request, wherein the access request is denied when the access request is received from the automated agent.

48. A computer program product for use in conjunction with a computer system, the computer program product comprising a computer readable storage medium and a computer program mechanism embedded therein, the computer program mechanism for selectively accepting access requests from a client computer connected to a server computer by a network, the computer program mechanism comprising:

instructions that receive an access request in the server computer from the client computer via the network;

instructions that generate a predetermined number of random characters to form a string in the server computer in response to the access request;

instructions that modify at least one perceptual attribute of the string of random characters to form a riddle configured to be easily answered by a human being with no advance knowledge of the riddle while being substantially difficult to answer by an automated agent unaided by a human being, the string being a correct answer to the riddle;

instructions that render the riddle on an output device of the client computer;

instructions that receive an answer to the riddle from the client computer;

instructions that determine if the answer to the riddle is correct;

instructions that accept the access request if the answer is correct and received within a predetermined time interval and that otherwise deny the access request, wherein the access request is denied when the access request is received from the automated agent.

49. The computer program product of claim 48 wherein the instructions that modify the string randomly modify at least one visual attribute of the string to form the riddle and the instructions that render the riddle render the riddle as an image on a display device of the client computer.

50. The computer program product of claim 49 wherein the instructions that modify the string assign a respective multiplicity of fonts to the respective characters in the string so as to modify the at least one visual attribute of the string to form the riddle.

51. The computer program product of claim 49 wherein the instructions render the random characters of the string using randomly selected fonts.

52. The computer program product of claim 49 wherein the instructions render the random characters of the string using randomly selected sizes of the characters.

53. The computer program product of claim 49 wherein the instructions render the random characters of the string using random spacing between the random characters.

54. The computer program product of claim 49 wherein the instructions render the random characters of the string along a randomly selected path.

55. The computer program product of claim 50 wherein the instructions render the random characters of the string rotated about a randomly selected point.

56. The computer program product of claim 50 wherein the instructions render the random characters of the string using randomly selected colors.

57. The computer program product of claim 50 wherein the instructions that render overlay the random characters of the string on a randomly selected background in the image.

58. The computer program product of claim 57 wherein the background is a randomly generated maze.

59. The computer program product of claim 48 further comprising instructions that discard similarly appearing random characters before forming the string.

60. The computer program product of claim 48 further comprising:

instructions that send a password to the user if a predetermined number of access requests are accepted from the client; and instructions that accept additional access requests from the client if the additional access requests are received along with the password.

61. The computer program product of claim 60 further including instructions that revoke the password if the rate at which the additional access requests are received is less than a predetermined threshold.

62. A computer system for selectively accepting access requests from a client computer connected to a server computer by a network, comprising:

a memory; and a processor to execute instructions stored in the memory, wherein the memory stores instructions that:

receive an access request in the server computer from the client computer via the network;

generate a predetermined number of random characters to form a string in the server computer in response to the access request;

modify at least one perceptual attribute of the string of random characters to form a riddle configured to be easily answered by a human being with no advance knowledge of the riddle while being substantially difficult to answer by an automated agent unaided by a human being, the string being a correct answer to the riddle;

render the riddle on an output device of the client computer;

receive an answer to the riddle from the client computer;

determine if the answer to the riddle is correct; and accept the access request if the answer is correct and received within a predetermined time interval and otherwise deny the access request, wherein the access request is denied when the access request is received from the automated agent.

63. The computer system of claim 62, the memory further storing instructions that modify the string randomly modify at least one visual attribute of the string to form the riddle and the instructions that render the riddle render the riddle as an image on a display device of the client computer.

64. The computer system of claim 63, wherein the instructions that modify the string assign a respective multiplicity of fonts to the respective characters in the string so as to modify the at least one visual attribute of the string to form the riddle.

65. The computer system of claim 63, the memory further storing instructions that render the random characters of the string using randomly selected fonts.

66. The computer system of claim 64, the memory further storing instructions that render the random characters of the string using randomly selected sizes of the characters.

67. The computer system of claim 64, the memory further storing instructions that render the random characters of the string using random spacing between the random characters.

68. The computer system of claim 64, the memory further storing instructions that render the random characters of the string along a randomly selected path.

69. The computer system of claim 64, the memory further storing instructions that render the random characters of the string rotated about a randomly selected point.

70. The computer system of claim 64, the memory further storing instructions that render the random characters of the string using randomly selected colors.

71. The computer system of claim 64, the memory further storing instructions that overlay the random characters of the string on a randomly selected background in the image.

72. The computer system of claim 71 wherein the background is a randomly generated maze.

73. The computer system of claim 62, the memory further storing instructions that discard similarly appearing random characters before forming the string.

74. The computer system of claim 62, the memory further storing instructions that:
- send a password to the user if a predetermined number of access requests are accepted from the client; and
- accept additional access requests from the client if the additional access requests are received along with the password.

75. The computer system of claim 74, the memory further storing instructions that revoke the password if the rate at which the additional access requests are received is less than a predetermined threshold.

* * * * *